(12) United States Patent
Murschall et al.

(10) Patent No.: US 6,855,435 B2
(45) Date of Patent: Feb. 15, 2005

(54) TRANSPARENT, UV-STABILIZED FILM MADE FROM A CRYSTALLIZABLE THERMOPLASTIC

(75) Inventors: Ursula Murschall, Nierstein (DE); Guenther Crass, Taunusstein (DE); Guenter Bewer, Wiesbaden (DE); Klaus Oberlaender, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/428,066

(22) Filed: May 2, 2003

(65) Prior Publication Data

US 2003/0203227 A1 Oct. 30, 2003

Related U.S. Application Data

(63) Continuation of application No. 09/533,813, filed on Mar. 24, 2000, now abandoned.

(30) Foreign Application Priority Data

Mar. 26, 1999 (DE) .......................................... 199 13 982
Sep. 23, 1999 (DE) .......................................... 199 45 560

(51) Int. Cl.$^7$ .......................... B32B 27/08; B32B 27/18; B32B 27/36; B32B 31/30
(52) U.S. Cl. .................... 428/480; 428/910; 264/288.4; 264/290.2; 524/86; 524/95; 524/96; 252/183.12; 528/308; 528/308.2; 528/308.6
(58) Field of Search ................................ 428/480, 910; 264/288.4, 290.2; 252/183.12; 524/86, 95, 96; 528/308, 308.2, 308.6

(56) References Cited

U.S. PATENT DOCUMENTS

| | | | |
|---|---|---|---|
| 3,931,211 A | 1/1976 | Weber | |
| 5,242,757 A | 9/1993 | Buisine et al. | |
| 5,573,842 A | 11/1996 | Gutweiler | |
| 5,607,897 A | 3/1997 | Masuda | |
| 5,783,307 A | 7/1998 | Fagerburg et al. | |
| 5,985,389 A | 11/1999 | Dalton et al. | |
| 6,387,585 B1 | 5/2002 | Katampe | |
| 2002/0176978 A1 | 11/2002 | Murschall et al. | |

FOREIGN PATENT DOCUMENTS

| | | |
|---|---|---|
| EP | 0 601 455 | 6/1994 |
| EP | 0 620 245 A1 | 10/1994 |
| GB | 2 300 192 | 10/1996 |
| WO | WO 98/06575 | 2/1998 |
| WO | WO 99/65989 | 12/1999 |

OTHER PUBLICATIONS

M. Day et al, "Photochemical Degradation of Poly(ethylene Terephthalate). III. Determination of Decomposition Products and Reaction Mechanism," J. Applied Polymer sci., vol. 16, pp. 203–215 (1972).

Derwent Abstract of EP 0 601 455.

Derwent Abstract of JP 03292141A.

Peter Schmitz et al., "Films", Reprint of an article from the fifth edition of Ullmann's Encyclopedia of Industrial Chemistry, VCH Verlagsgesellschaft mbH, vol. A11.

*Primary Examiner*—Vivian Chen
(74) *Attorney, Agent, or Firm*—Finnegan, Henderson, Farabow, Garrett & Dunner, LLP

(57) ABSTRACT

A transparent film whose thickness is in the range from 1 to 500 μm and which comprises, as principal constituent, a crystallizable thermoplastic, wherein the film comprises at least one UV stabilizer as light stabilizer and at least one optical brightener, and to the use of the film, and also to a process for its production.

26 Claims, No Drawings

TRANSPARENT, UV-STABILIZED FILM MADE FROM A CRYSTALLIZABLE THERMOPLASTIC

This application is a continuation of parent application Ser. No. 09/533,813, filed on Mar. 24, 2000 abandoned, the contents of which are incorporated by reference herein.

This application claims priority benefit under 35 U.S.C. §119 of German application 199 13 982.2, filed Mar. 26, 1999, and German application 199 45 560.0, filed Sep. 23, 1999. Both of these German applications are incorporated by reference herein.

FIELD OF THE INVENTION

The invention relates to a transparent, UV-stabilized film whose thickness is in the range from 1 to 500 μm and which is made from a crystallizable thermoplastic. The film comprises at least one UV stabilizer as light stabilizer and at least one optical brightener. The film is distinguished by good orientability and excellent optical and mechanical properties. The invention further relates to the use of this film, and also to a process for its production.

DESCRIPTION OF THE RELATED ART

Transparent films made from crystallizable thermoplastics of thickness from 1 to 500 μm are well known.

These known films do not comprise any type of UV stabilizer as light stabilizer, and therefore neither the films nor the items produced from them are suitable for outdoor applications. After only a short time in outdoor applications the films exhibit yellowing and impairment of their mechanical properties due to photooxidative degradation by sunlight.

EP-A-0 620 245 describes films of improved thermal stability. These films comprise antioxidants suitable for scavenging free radicals formed in the film and destroying any peroxide formed. However, no proposal can be found in this text as to how the UV stability of films of this type might be improved.

WO 98/06575 describes a matt, sealable film which comprises at least one UV absorber. The UV absorber here has to ensure that there is no drastic impairment of the mechanical properties of the film after weathering. The film has a gloss of less than 60% and a haze which is between 30% and 70%. The sealability is achieved by coextruding the film with a copolyester. The nonsealable side must be rough and therefore low-gloss and matt, in order that the film can be wound up and further processed, since these copolyesters have high adhesion to the nonsealable side. The tendency to adhere is reduced by the high roughness and by adding pigments. However, the film is not suitable for high-transparency, high-gloss applications, where ideal optical properties are required, together with a low Yellowness Index and absorption of short-wave UV light. The roughness and the mattness of the film means that short-wave UV light is destroyed as it passes through the film. This film cannot be simultaneously highly transparent and glossy, since it could not then be wound or further processed. In addition, these films have an unacceptable Yellowness Index (YID). The text makes no suggestion as to how a low Yellowness Index (<10) can be achieved.

SUMMARY OF THE INVENTION

An object of the present invention was to provide a transparent film of thickness from 1 to 500 μm which, besides good orientability, good mechanical and optical properties, has in particular high UV stability.

High UV stability means that the films are not damaged, or only very slightly damaged, by sunlight or other UV radiation, and that they are therefore suitable for outdoor applications and/or critical indoor applications. In particular, when used outdoors for a number of years the films should not yellow and not exhibit embrittlement or surface-cracking, nor show any impairment of their mechanical properties. High UV stability therefore means that the film absorbs UV light and only transmits light once the visible range has been reached.

Examples of good optical properties are high luminous transmittance ($\geq 84\%$), high surface gloss (>120), extremely low haze (<20%), and also a low Yellowness Index (YID<10).

Good mechanical properties include a high modulus of elasticity ($E_{MD}$>3300 N/mm$^2$; $E_{TD}$>5000 N/mm$^2$) and also good tear resistance (in MD>130 N/mm$^2$; in TD>180 N/mm$^2$) and good longitudinal and transverse elongation at break (in MD>120%; in TD>70%).

Good orientability includes excellent capabilities of the film for orientation both longitudinally and transversely without break-offs.

In addition, the novel film should be recyclable, in particular without loss of the optical and mechanical properties, and also should have low combustibility, so that it can also be used, for example, for indoor applications and in the construction of exhibition stands.

This object is achieved by means of a transparent film whose thickness is in the range from 1 to 500 μm and which comprises, as principal constituent, a crystallizable thermoplastic, wherein the film comprises at least one UV stabilizer as light stabilizer and an optical brightener, where the UV stabilizer and/or the optical brightener are usefully fed directly as masterbatch during film production.

DETAILED DESCRIPTION OF THE INVENTION

The transparent film of the invention comprises, as principal constituent, a crystallizable thermoplastic. Examples of suitable crystallizable or semicrystalline thermoplastics are polyethylene terephthalate, polybutylene terephthalate and polyethylene naphthalate, preferably polyethylene terephthalate.

According to the invention, crystallizable thermoplastics are crystallizable homopolymers, crystallizable copolymers, crystallizable compounds, crystallizable recycled material, and other types of crystallizable thermoplastics.

The transparent film may have one layer or two or more layers. It may also have a coating of various copolyesters or adhesion promoters.

The transparent film comprises at least one UV stabilizer as light stabilizer, and this is usefully fed directly during film production, using masterbatch technology. The concentration of the UV stabilizer is preferably from 0.01% by weight to 5% by weight, based on the weight of the crystallizable thermoplastic layer.

Light, in particular the ultraviolet portion of sunlight, i.e. the wavelength range from 280 to 400 nm, causes degradation in thermoplastics, as a result of which their appearance changes, due to color change or yellowing, and their mechanical and physical properties are adversely affected.

Inhibition of this photooxidative degradation is of considerable industrial and commercial importance, since without it the scope of application of many thermoplastics is severely restricted.

Polyethylene terephthalates, for example, already begin to absorb UV light at under 360 nm, and their absorption increases considerably at under 320 nm and is very pronounced at under 300 nm. Maximum absorption occurs between 280 and 300 nm.

In the presence of oxygen it is primarily chain cleavages, and not crosslinking, which is observed. The predominant photooxidation products are carbon monoxide, carbon dioxide and carboxylic acids. Other oxidation reactions which have to be taken into consideration, besides the direct photolysis of the ester groups, proceed via peroxide radicals, again resulting in formation of carbon dioxide.

However, the photooxidation of polyethylene terephthalates may also proceed via elimination of hydrogen at the $\alpha$ position of the ester groups to give hydroperoxides and their decomposition products, and also chain cleavages associated therewith (H. Day, D. M. Wiles: J. Appl. Polym. Sci. 16, 1972, page 203).

Light stabilizers which are UV stabilizers, i.e. UV absorbers, are chemical compounds which can intervene in the physical and chemical processes of light-induced degradation. Carbon black and other pigments can provide some degree of protection from the adverse effects of light, but these substances are unsuitable for transparent films since they cause discoloration or color change. The only compounds suitable for transparent films are organic or organometallic compounds which give no, or only an extremely low level of, color or color change to the thermoplastic to be stabilized.

Light stabilizers which are suitable UV stabilizers absorb at least 70%, preferably 80%, particularly preferably 90%, of the UV light in the wavelength range from 180 to 380 nm, preferably from 280 to 350 nm. Those which are particularly suitable are those which in the temperature range from 260 to 300° C. are thermally stable, i.e. do not decompose and do not cause release of gases. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preferably the 2-hydroxybenzotriazoles and the triazines.

A further constituent present in the film, according to the invention, is at least one optical brightener. The optical brighteners according to the invention are capable of absorbing UV radiation in the wavelength range from about 360 to 380 nm and of emitting this again as visible, longer-wavelength, blue-violet light. Suitable optical brighteners are bisbenzoxazoles, phenylcoumarins and bissterylbiphenyls, in particular phenyl coumarin, and particularly preferably triazine-phenylcoumarin (Tinopal®, Ciba-Geigy, Basle, Switzerland).

Besides the optical brightener, blue dyes soluble in polyester may also be added if this is useful. Dyes which have proven successful are cobalt blue, ultramarine blue and anthraquinone dyes, in particular Sudan blue 2 (BASF, Ludwigshafen, Germany).

The amounts of the optical brighteners used are from 10 to 50,000 ppm, in particular from 20 to 30,000 ppm, particularly preferably from 50 to 25,000 ppm (based on the weight of the layer to be provided with these).

The amounts of the blue dyes used are from 10 to 10,000 ppm, in particular from 20 to 5000 ppm, particularly preferably from 50 to 1000 ppm (based on the weight of the layer to be provided with these).

It was highly surprising that the use of the abovementioned combination of UV stabilizers, optical brighteners and, if present, blue dye in films gave the desired result. The person skilled in the art would probably have initially attempted to achieve some degree of UV stability by using an antioxidant but would have found that the film rapidly yellows on weathering.

In the knowledge that UV stabilizers absorb UV light and therefore provide protection, the skilled worker would be likely to have used commercially available UV stabilizers. He would then have observed that the UV stabilizer has unsatisfactory thermal stability and at temperatures of from 200 to 240° C. decomposes or releases gases, and large amounts (from about 10 to 15% by weight) of UV stabilizer have to be incorporated so that the UV light is absorbed and the film therefore not damaged.

At these high concentrations he would have observed that the film is already yellow just after it has been produced, with Yellowness Index deviations (YID) around 25. He would have also observed that its mechanical properties are adversely affected. Orientation would have produced exceptional problems, such as break-offs due to unsatisfactory strength, i.e. modulus of elasticity, die deposits, causing profile variations, roller deposits from the UV stabilizer, causing impairment of optical properties (poor haze, defective adhesion, nonuniform surface), and deposits in stretching or heat-setting frames, dropping onto the film.

It was therefore more than surprising that even low concentrations of the UV stabilizer according to the invention, combined with the optical brightener and, if desired, the blue dye, achieve excellent UV protection. It was very surprising that, together with this excellent UV protection the Yellowness Index of the film is unchanged from that of an unstabilized film within the limits of measurement accuracy, there are no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

The film is therefore also commercially viable.

It is also very surprising that even the recycled material can be reused without any adverse effect on the Yellowness Index of the film.

In a particularly preferred embodiment, the novel transparent film comprises, as principal constituent, a crystallizable polyethylene terephthalate and from 0.01 to 5.0% by weight of 2-(4,6-diphenyl-1,3,5-triazin-2-yl)-5-(hexyl) oxyphenol (structure in Formula 1a) or from 0.01 to 5.0% by weight of 2,2'-methylenebis(6-(2H-benzotriazol-2-yl)-4-(1,1,3,3-tetramethylbutyl)phenol (structure in Formula 1b).

Formula 1a: 2-(4,6-Diphenyl-1,3,5-triazin-2-yl)-5-(hexyl) oxyphenol

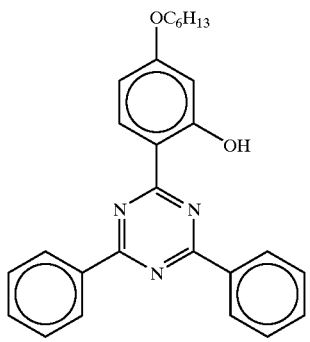

Formula 1b: 2,2'-Methylenebis(6-(2H-benzotriazol-2-yl)-4-(1,1,3,3,-tetramethylbutyl)phenol

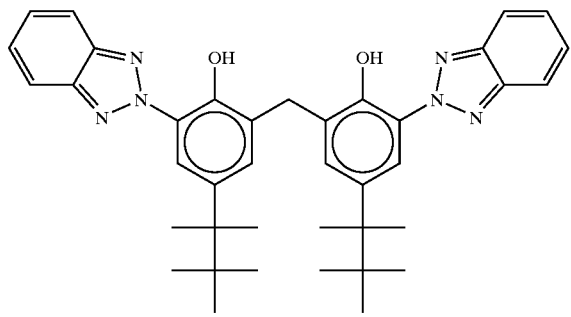

In a preferred embodiment it is also possible to use mixtures of these two UV stabilizers or mixtures of at least one of these two UV stabilizers with other UV stabilizers, where the total concentration of light stabilizer is preferably from 0.01 to 5.0% by weight, based on the weight of crystallizable polyethylene terephthalate.

The surface gloss, measured to DIN 67530 (measurement angle 200), is greater than 120, preferably greater than 140; the luminous transmittance, measured to ASTM-D 1003, is more than 84%, preferably more than 86% and the haze of the film, measured to ASTM D 1003, is less than 20%, preferably less than 15% which is surprisingly good for the UV stability achieved.

The standard viscosity SV (DCA) of the polyethylene terephthalate, measured in dichloroacetic acid to DIN 53728, is from 600 to 1000, preferably from 700 to 900.

The intrinsic viscosity IV (DCA) is calculated from the standard viscosity SV (DCA) as follows:

$$IV(DCA)=6.67 \cdot 10^{-4} SV(DCA)+0.118$$

The transparent polyethylene terephthalate film, which comprises at least one UV stabilizer and at least one optical brightener, may have one layer or else two or more layers.

In the embodiment having two or more layers the film is composed of at least one core layer and at least one outer layer, and particular preference is given to a three-layer A-B-A or A-B-C structure. For this embodiment it is important that the standard viscosity of the polyethylene terephthalate of the core layer is similar to that of the polyethylene terephthalate of the outer layer(s) adjacent to the core layer.

In a particular embodiment, the outer layers may also be composed of a polyethylene naphthalate homopolymer or polyethylene terephthalate-polyethylene naphthalate copolymer or compound. In this embodiment, the standard viscosity of the thermoplastics of the outer layers is again similar to that of the polyethylene terephthalate of the core layer.

In the embodiment having two or more layers, the UV stabilizer and the optical brightener and the blue dye, if present, are preferably in the outer layer(s). However, if required the core layer may also have been provided with UV stabilizers.

Unlike in the single-layer embodiment, the concentration here of the stabilizer(s) is based on the weight of the thermoplastics in the layer provided with UV stabilizer(s).

Very surprisingly, weathering experiments to the test specification of ISO 4892 using an Atlas Ci 65 Weather-Ometer have shown that, in the case of a three-layer film, provision of UV stabilizers and optical brighteners and, if desired, blue dye, in the outer layers of from 0.5 to 2 μm thickness is fully sufficient to achieve improved stability.

As a result, the UV-stabilized films having two or more layers and produced using known coextrusion technology are of greater commercial interest than the fully UV-stabilized monofilms, since significantly less UV stabilizers are needed for comparable UV stability.

The film may also have, at least on one side, a scratch-resistant coating, a copolyester or an adhesion promoter.

Weathering tests have shown that, even after from 5 to 7 years (extrapolated from the weathering tests) in outdoor applications the novel UV-stabilized films generally show no yellowing, no embrittlement, no loss of surface gloss, no surface cracking and no impairment of their mechanical properties.

During production of the film it was observed that the UV-stabilized film has excellent capability for longitudinal and transverse orientation, without break-off. In addition, no gas releases of any type resulting from use of the UV stabilizer and/or of the optical brightener and/or the blue dye were observed in the production process, and this is significant for the invention, since most UV stabilizers give problematic and undesirable release of gases at extrusion temperatures above 260° C., making them unusable.

Measurements also showed that the novel film has low combustibility and low flammability, and is therefore suitable, for example, for indoor applications and for the construction of exhibition stands. Surprisingly, even in the thickness range from 350 to 500 μm the novel films qualify for building materials classification B2. Surprisingly, films of from 350 to 500 μm also qualify for fire protection grade S4 of DIN 5510, smoke generation SR2 and burning droplets performance ST1.

The novel film can also readily be recycled without pollution of the environment and without loss of mechanical properties, and it is therefore suitable, for example, for use as fast-turnover advertising placards or other promotional items.

The novel transparent, UV-stabilized film may be produced, for example, by extrusion on an extrusion line.

According to the invention, the light stabilizer and the optical brightener and, if desired, the blue dye may be added by the actual producer of the thermoplastic raw material, or fed to the extruder during film production.

The light stabilizer and the optical brightener and the blue dye, if present, are particularly preferably added using masterbatch technology. The abovementioned light-stabilizing components are dispersed completely in a solid carrier material. Possible carrier materials are the thermoplastic itself, e.g. the polyethylene terephthlate, or else other polymers which have sufficient compatibility with the thermoplastic.

In masterbatch technology it is important that the particle size and the bulk density of the masterbatch is similar to the particle size and the bulk density of the thermoplastic, to give uniform distribution and, with this, uniform UV stabilization.

The polyester films may be produced by known processes from a polyester raw material with, if desired, other raw materials, and the abovementioned light-stabilizing components and/or a usual amount of from 0.1 to a maximum of 10% by weight of any other usual additives, either in the form of monofilms or else in the form of, if desired, coextruded films having two or more layers and with identical or differently constructed surfaces, where one surface may have, for example, pigment, and no pigment is present at the other surface. One or both surfaces of the film may also be provided with a conventional functional coating, using known processes.

In the preferred extrusion process for producing the polyester film, the melted polyester material is extruded through a slot die and, in the form of a substantially amorphous prefilm, quenched on a chill roll. This film is then reheated and stretched longitudinally and transversely, or transversely and longitudinally, or longitudinally, transversely and again longitudinally and/or transversely. The stretching temperatures are generally $T_g+10°$ C. to $T_g+60°$ C. ($T_g$=glass transition temperature), and the usual stretching ratio is from 2 to 6, in particular from 3 to 4.5, for the longitudinal stretching, and from 2 to 5, in particular from 3 to 4.5, for the transverse stretching, and from 1.1 to 3 for any second longitudinal stretching carried out. The first longitudinal stretching may, if desired, be carried out simultaneously with the transverse stretching (simultaneous stretching). There then follows the heat-setting of the film at oven temperatures of from 200 to 260° C., in particular from 220 to 250° C. The film is then cooled and wound up.

The surprising combination of excellent properties makes the novel transparent film highly suitable for a wide variety of applications, for example for internal decoration, for the construction of exhibition stands and exhibition items, for displays, for placards, for protective glazing in machines and vehicles, in the lighting sector, in fitting out shops and stores, or as a promotional product or laminating material.

The good UV stability of the novel transparent film also makes it suitable for outdoor applications, e.g. greenhouses, roofing systems, external cladding, protective coverings, applications in the construction sector, and illuminated advertising profiles.

The invention is described in more detail below using working examples.

The following standards or methods are used here for measuring the individual properties.

Test Methods

Surface Gloss:
Surface gloss is measured to DIN 67530 with a measurement angle of 20°.

Luminous Transmittance:
Luminous transmittance is the ratio of total transmitted light to the amount of incident light.
Luminous transmittance is measured to ASTM D 1003 using "Hazegard plus" test equipment.

Haze
Haze is that percentage proportion of the transmitted light which deviates by more than 2.5° from the average direction of the incident light beam. Clarity is determined at an angle of less than 2.5°.
The haze is measured using a "Hazegard plus" apparatus ASTM D 1003.

Surface Defects:
Surface defects are determined visually.

Mechanical Properties:
Modulus of elasticity, tear resistance and elongation at break are measured in longitudinal and transverse directions to ISO 527-1-2.

SV (DCA) and IV (DCA):
Standard viscosity SV (DCA) is measured by a method based on DIN 53726, in dichloroacetic acid.

Intrinsic viscosity (IV) is calculated as follows from the standard viscosity (SV):

$$IV(DCA)=6.67 \cdot 10^{-4} SV(DCA)+0.118$$

Weathering (Bilateral) and UV Stability:
UV stability is tested to the test specification of ISO 4892 as follows:

| | |
|---|---|
| Test equipment: | Atlas Ci 65 Weather-Ometer |
| Test conditions: | ISO 4892, i.e. artificial weathering |
| Irradiation time: | 1000 hours (per side) |
| Irradiation: | 0.5 W/m², 340 nm |
| Temperature: | 63° C. |
| Relative humidity: | 50% |
| Xenon lamp: | Internal and external filter made from borosilicate |
| Irradiation cycles: | 102 minutes of UV light, then 18 minutes of UV light with water spray onto the specimens, then another 102 minutes of UV light, etc. |

Color Difference:
The color difference of the specimens after artificial weathering is measured using a spectrophotometer to DIN 5033.
Here:
ΔL: Difference in the light-dark direction
+ΔL: The specimen is lighter than the standard
−ΔL: The specimen is darker than the standard
ΔA: Difference in the red-green direction
+ΔA: The specimen is redder than the standard
−ΔA: The specimen is greener than the standard
ΔB: Difference in the blue-yellow direction
+ΔB: The specimen is yellower than the standard
−ΔB: The specimen is bluer than the standard
ΔE: Total color difference
$\Delta E=\Delta L^2+\Delta A^2+\Delta B^2$ The greater the numerical deviation from the standard, the larger the color difference.
Numerical values ≦0.3 can be neglected and indicate that there is no significant color difference.

Yellowness Index
The Yellowness Index is the deviation from the colorless condition in the "yellow" direction and is measured to DIN 6167. Yellowness Indices of <5 are not visually detectable.

The transparent films of varying thickness and having one layer in the examples and comparative examples below are produced on the extrusion line described.

Each of the films was weathered to the test specification of ISO 4892 for 1000 hours per side using an Atlas Ci 65 Weather-Ometer, and then tested for mechanical properties, discoloration, surface defects, haze and gloss.

EXAMPLE 1

A transparent film of 50 μm thickness was produced and had polyethylene terephthalate as principal constituent, 0.3% by weight of Sylobloc and 1.0% by weight of the UV stabilizer 2-(4,6-diphenyl-1,3,5-triazin-2-yl)-5-(hexyl) oxyphenol (®Tinuvin 1577 from Ciba-Geigy, Basle, Switzerland) and 0.02% by weight of triazinephenylcoumarin (Tinopal®, Ciba-Geigy, Basle, Switzerland) and 0.01% by weight of anthraquinone dye (Sudan Blue 2, BASF, Ludwigshafen, Germany).

Tinuvin 1577 has a melting point of 149° C. and is thermally stable to about 330° C.

To achieve uniform distribution, 0.3% by weight of Sylobloc and 1.0% by weight of the UV stabilizer and 0.02% by weight of Tinopal and 0.01% by weight of Sudan Blue 2 were incorporated directly into the polyethylene terephthalate.

The polyethylene terephthalate used to produce the transparent film had a standard viscosity SV (DCA) of 810, corresponding to an intrinsic viscosity IV (DCA) of 0.658 dl/g.

The transparent PET film produced had the following property profile:

| | |
|---|---|
| Thickness | 50 μm |
| Surface gloss, side 1 | 155 |
| (Measurement angle 20°) side 2 | 152 |
| Luminous transmittance | 91% |
| Haze | 4.0% |
| Surface defects per m$^2$ | none |
| Longitudinal mod. of elasticity | 4300 N/mm$^2$ |
| Transverse mod. of elasticity | 5800 N/mm$^2$ |
| Longitudinal tear resistance | 190 N/mm$^2$ |
| Transverse tear resistance | 280 N/mm$^2$ |
| Longitudinal elongation at break | 170% |
| Transverse elongation at break | 85% |
| Yellowness Index (YID) | 3.1 |

After 1000 hours of weathering per side using an Atlas Ci 65 Weather-Ometer the PET film had the following properties:

| | |
|---|---|
| Thickness | 50 μm |
| Surface gloss, side 1 | 145 |
| (Measurement angle 20°) side 2 | 141 |
| Luminous transmittance | 90.1% |
| Haze | 4.5% |
| Total color change ΔE | 0.22 |
| Dark color change ΔL | −0.18 |
| Red-green color change ΔA | −0.08 |
| Blue-yellow color change ΔB | 0.10 |
| Surface defects (cracks, signs of embrittlement) | none |
| Yellowness Index (YID) | 3.6 |
| Longitudinal mod. of elasticity | 4150 N/mm$^2$ |
| Transverse mod. of elasticity | 5600 N/mm$^2$ |
| Longitudinal tear resistance | 170 N/mm$^2$ |
| Transverse tear resistance | 250 N/mm$^2$ |
| Longitudinal elongation at break | 150% |
| Transverse elongation at break | 70% |

EXAMPLE 2

A transparent film was produced in a manner similar to that of Example 1. The UV stabilizer 2-(4,6-diphenyl-1,3,5-triazin-2-yl)-5-(hexyl)oxyphenol (®Tinuvin 1577), and also Tinopal and Sudan Blue 2 were fed in the form of a masterbatch. The masterbatch was composed of 5% by weight of ®Tinuvin 1577, 0.2% by weight of Tinopal and 0.1% by weight of Sudan Blue 2 as active component and 94.7% by weight of the polyethylene terephthalate of Example 1.

Prior to extrusion, 90% by weight of the polyethylene terephthalate of Example 1 was dried with 10% by weight of the masterbatch for 5 hours at 170° C. Extrusion and film production were carried out in a manner similar to that of Example 1.

The transparent PET film produced had the following property profile:

| | |
|---|---|
| Thickness | 50 μm |
| Surface gloss, side 1 | 160 |
| (Measurement angle 20°) side 2 | 157 |
| Luminous transmittance | 91.3% |
| Haze | 3.8% |
| Surface defects (fish-eyes, orange peel, bubbles, etc.) | none |
| Longitudinal mod. of elasticity | 4200 N/mm$^2$ |
| Transverse mod. of elasticity | 5650 N/mm$^2$ |
| Longitudinal tear resistance | 160 N/mm$^2$ |
| Transverse tear resistance | 250 N/mm$^2$ |
| Longitudinal elongation at break | 160% |
| Transverse elongation at break | 75% |
| Yellowness Index (YID) | 3.4 |

After 1000 hours of weathering per side using an Atlas Ci 65 Weather-Ometer the PET film had the following properties:

| | |
|---|---|
| Thickness | 50 μm |
| Surface gloss, side 1 | 148 |
| (Measurement angle 20°) side 2 | 146 |
| Luminous transmittance | 89.9% |
| Haze | 4.1% |
| Total color change ΔE | 0.24 |
| Dark color change ΔL | −0.19 |
| Red-green color change ΔA | −0.08 |
| Blue-yellow color change ΔB | 0.12 |
| Surface defects (cracks, embrittlement) | none |
| Yellowness Index (YID) | 4.3 |
| Longitudinal mod. of elasticity | 4050 N/mm$^2$ |
| Transverse mod. of elasticity | 5500 N/mm$^2$ |
| Longitudinal tear resistance | 151 N/mm$^2$ |
| Transverse tear resistance | 238 N/mm$^2$ |
| Longitudinal elongation at break | 152% |
| Transverse elongation at break | 68% |

EXAMPLE 3

A transparent film of 350 μm thickness was produced in a manner similar to that of Example 2. The PET film produced had the following property profile:

| | |
|---|---|
| Thickness | 350 μm |
| Surface gloss, side 1 | 149 |
| (Measurement angle 20°) side 2 | 144 |
| Luminous transmittance | 84.1% |
| Haze | 13.1% |
| Surface defects per m$^2$ (fish-eyes, orange peel, bubbles, etc.) | none |
| Yellowness Index | 4.5 |
| Longitudinal mod. of elasticity | 3600 N/mm$^2$ |
| Transverse mod. of elasticity | 4200 N/mm$^2$ |
| Longitudinal tear resistance | 180 N/mm$^2$ |
| Transverse tear resistance | 200 N/mm$^2$ |
| Longitudinal elongation at break | 220% |
| Transverse elongation at break | 190% |

After 1000 hours of weathering per side with an Atlas Ci 65 Weather-Ometer the PET film had the following properties:

| | |
|---|---|
| Thickness | 350 μm |
| Surface gloss, side 1 | 136 |
| (Measurement angle 20°) side 2 | 131 |
| Luminous transmittance | 84.3% |

-continued

| | |
|---|---|
| Haze | 14.0% |
| Total color change ΔE | 0.47 |
| Dark color change ΔL | −0.18 |
| Red-green color change ΔA | −0.09 |
| Blue-yellow color change ΔB | +0.42 |
| Surface defects (cracks, embrittlement) | none |
| Yellowness Index (YID) | 5.4 |
| Longitudinal mod. of elasticity | 3500 N/mm$^2$ |
| Transverse mod. of elasticity | 4050 N/mm$^2$ |
| Longitudinal tear resistance | 165 N/mm$^2$ |
| Transverse tear resistance | 185 N/mm$^2$ |
| Longitudinal elongation at break | 200% |
| Transverse elongation at break | 170% |

EXAMPLE 4

Coextrusion technology was used to produce a multilayer PET film of 50 μm thickness with the layer sequence A-B-A, where B is the core layer and A are the outer layers. The thickness of the core layer B is 48 μm, and each of the two outer layers covering the core layer has a thickness of 1 μm.

The polyethylene terephthalate used for the core layer B was identical with that of Example 2 but did not contain Sylobloc. The polyethylene terephthalate of the outer layers A was identical with the polyethylene terephthalate of Example 2, i.e. the raw material of the layer had 0.3% of Sylobloc.

5% by weight of ®Tinuvin 1577, 0.2% by weight of ®Tinopal and 0.1% by weight of Sudan Blue 2 were used as masterbatch in a manner similar to that of Example 2, but 20% by weight of the masterbatch was fed, using masterbatch technology, only to the outer layers of 1 μm thickness.

The transparent, multilayer PET film produced, UV-stabilized in the outer layers, had the following property profile:

| | |
|---|---|
| Layer structure | A-B-A |
| Overall thickness | 50 μm |
| Surface gloss, side 1 | 164 |
| (Measurement angle 20°) side 2 | 159 |
| Luminous transmittance | 94.2% |
| Haze | 2.1% |
| Surface defects (fish-eyes, orange peel, bubbles, etc.) | none |
| Longitudinal mod. of elasticity | 4300 N/mm$^2$ |
| Transverse mod. of elasticity | 5720 N/mm$^2$ |
| Longitudinal tear resistance | 180 N/mm$^2$ |
| Transverse tear resistance | 265 N/mm$^2$ |
| Longitudinal elongation at break | 165% |
| Transverse elongation at break | 85% |
| Yellowness Index (YID) | 2.9 |

After 1000 hours of weathering per side with an Atlas Ci 65 Weather-Ometer the multilayer film had the following properties:

| | |
|---|---|
| Layer structure | A-B-A |
| Overall thickness | 50 μm |
| Surface gloss, side 1 | 152 |
| (Measurement angle 20°) side 2 | 150 |
| Luminous transmittance | 92.3% |
| Haze | 3.0% |
| Total color change ΔE | 0.25 |
| Dark color change ΔL | −0.20 |
| Red-green color change ΔA | −0.09 |

-continued

| | |
|---|---|
| Blue-yellow color change ΔB | 0.13 |
| Surface defects (fish-eyes, orange peel, bubbles, etc.) | none |
| Longitudinal mod. of elasticity | 4175 N/mm$^2$ |
| Transverse mod. of elasticity | 5650 N/mm$^2$ |
| Longitudinal tear resistance | 165 N/mm$^2$ |
| Transverse tear resistance | 250 N/mm$^2$ |
| Longitudinal elongation at break | 155% |
| Transverse elongation at break | 75% |
| Yellowness Index (YID) | 3.0 |

COMPARATIVE EXAMPLE 1

A PET monofilm of 50 μm thickness was produced in a manner similar to that of Example 1. Unlike in Example 1, no UV stabilizer, no optical brightener and no blue dye was present in the film.

The unstabilized white film produced had the following property profile:

| | |
|---|---|
| Thickness | 50 μm |
| Surface gloss, side 1 | 160 |
| (Measurement angle 20°) side 2 | 155 |
| Luminous transmittance | 91.8% |
| Haze | 3.6% |
| Surface defects (fish-eyes, orange peel, bubbles, etc.) | none |
| Longitudinal mod. of elasticity | 4350 N/mm$^2$ |
| Transverse mod. of elasticity | 5800 N/mm$^2$ |
| Longitudinal tear resistance | 185 N/mm$^2$ |
| Transverse tear resistance | 270 N/mm$^2$ |
| Longitudinal elongation at break | 160% |
| Transverse elongation at break | 80% |
| Yellowness Index (YID) | 2.7 |

After 1000 hours of weathering per side using an Atlas Ci 65 Weather-Ometer the film showed signs of embrittlement and cracking on the surfaces. Precise measurement of its property profile—in particular mechanical properties—was therefore no longer possible. The film also became visibly yellow.

COMPARATIVE EXAMPLE 2

A film was produced as in Example 1 of WO 98/06575. The film has a thickness of 30 μm, comprised a sealable layer of 5 μm thickness, and in the base layer comprised 1% by weight of ®Tinuvin 1577 FF, and had the following properties

| | |
|---|---|
| Gloss of side 1 | 43% |
| Measurement angle | 60° |
| Yellowness Index (YID) | 15 |
| Haze | 67% |

The film produced had an unacceptably high Yellowness Index, high haze and low gloss. After 1000 hours per side of weathering using an Atlas CI 65 Weather Ometer the film showed embrittlement and cracks on its surfaces. It was no longer possible to determine an accurate property spectrum.

What is claimed is:

1. A transparent, biaxially oriented film having a thickness of 1 to 500 μm, which comprises a crystallizable thermoplastic, at least one UV stabilizer, and a bisbenzoxazole, a phenylcoumarin, a bisstyrylbiphenylene, or a mixture thereof as optical brightener in an amount of from 10 to 50,000 ppm based on the weight of the layer to be provided with these, wherein the film retains a surface gloss, measured according to DIN 67530 and using a measurement angle of 20°, of from 131 to 152, and wherein the film retains a luminous transmittance, measured according to ASTM D 1003, of from 84.3% to 92.3%, wherein the film retains the gloss and luminous transmittance when weathered to the test specification of ISO 4892 for 1000 hours per side using an Atlas Ci 65 Weather-Ometer.

2. A film as claimed in claim 1, wherein the concentration of the UV stabilizer is 0.01 to 5% by weight, based on the weight of the crystallizable thermoplastic.

3. A film as claimed in claim 1, wherein the UV stabilizer is a 2-hydroxybenzotnazole or a triazine.

4. A film as claimed in claim 3, wherein the UV stabilizer is 2-(4,6-diphenyl-1,3,5-triazin-2-yl)-5-(hexyl)oxyphenol or 2,2'-methylenebis(6-(2H-benzotriazol-2-yl)-(1,1,3,3-tetramethylbutyl)phenol.

5. A film as claimed in claim 1, wherein the haze of the film, measured according to ASTM D 1003, is less than 20.

6. A film as claimed in claim 1, wherein the crystallinity of the crystallizable thermoplastic is from 5 to 65%.

7. A film as claimed in claim 1, wherein the crystallizable thermoplastic is polyethylene terephthalate, polybutylene terephthalate, polyethylene naphthalate, or a mixture thereof.

8. A film as claimed in claim 7, wherein the crystallizable thermoplastic is polyethylene terephthalate.

9. A film as claimed in claim 8, wherein the polyethylene terephthalate is recycled polyethylene terephthalate material.

10. A film as claimed in claim 8, wherein the polyethylene terephthalate has a crystalline melting point, measured by DSC using a heating rate of 10° C./min, of 220 to 280° C.

11. A film as claimed in claim 8, wherein the polyethylene terephthalate has a crystallization temperature, measured by DSC using a heating rate of 10° C./min, of 75 to 280° C.

12. A film as claimed in claim 8, wherein the polyethylene terephthalate has a standard viscosity SV (DCA), measured in dichioroacetic acid according to DIN 53728, of 600 to 1000.

13. A film as claimed in claim 1, wherein the film has a single-layer structure.

14. A film as claimed in claim 1, wherein the film has a structure of two or more layers with at least one outer layer and at least one core layer.

15. A film as claimed in claim 14, wherein the structure of two or more layers has two outer layers and one core layer located between the outer layers.

16. A film as claimed in claim 14, wherein at least one UV stabilizer is present in at least one outer layer.

17. A film as claimed in claim 14, wherein at least one outer layer comprises polyethylene terephthalate.

18. A film as claimed in claim 14, wherein at least one outer layer comprises polyethylene naphthalate.

19. A film as claimed in claim 14, wherein at least one outer layer comprises copolymers or other compounds made from polyethylene terephthalate and polyethylene naphthalate.

20. A film as claimed in claim 1, wherein the film has an adhesion promoter on at least one surface of the film.

21. A film as claimed in claim 1, wherein the film has a copolyester on at least one surface of the film.

22. A film as claimed in claim 1, wherein the film has a scratch-resistant coating on at least one surface of the film.

23. A film as claimed in claim 1, wherein the Yellowness Index of the film, measured according to DIN 6167, is less than 10.

24. A process for producing a transparent film as claimed in claim 1, which comprises melting a crystallizable thermoplastic in an extruder together with at least one UV stabilizer and at least one optical brightener, extruding it onto a chill roll, orienting it biaxially, setting it and winding it up.

25. A process as claimed in claim 24, wherein the crystallizable thermoplastic is dried in the extruder prior to melting.

26. A process as claimed in claim 24, wherein the UV stabilizer, the optical brightener, or both the UV stabilizer and optical brightener is added using masterbatch technology.

* * * * *

UNITED STATES PATENT AND TRADEMARK OFFICE
CERTIFICATE OF CORRECTION

PATENT NO. : 6,855,435 B2
DATED : February 15, 2005
INVENTOR(S) : Ursula Murschall et al.

It is certified that error appears in the above-identified patent and that said Letters Patent is hereby corrected as shown below:

Column 13,
Line 16, "2-hydroxybenzotnazole" should read -- 2-hydroxybenzotriazole --.
Line 19, "2 ,2'-methylenebis(6-(2H-benzotriazol-2-yl)-(1,1,3,3-" should read -- 2,2'-methylenebis(6-(2H-benzotriazol-2-yl)-(1,1,3,3- --.
Line 40, "dichioroacetic" should read -- dichloroacetic --.

Signed and Sealed this

Twenty-fourth Day of May, 2005

JON W. DUDAS
*Director of the United States Patent and Trademark Office*